April 24, 1962 M. L. BARTON ET AL 3,031,527
ULTRA STABLE FREQUENCY SHIFT KEYING SYSTEM
Filed Sept. 8, 1959
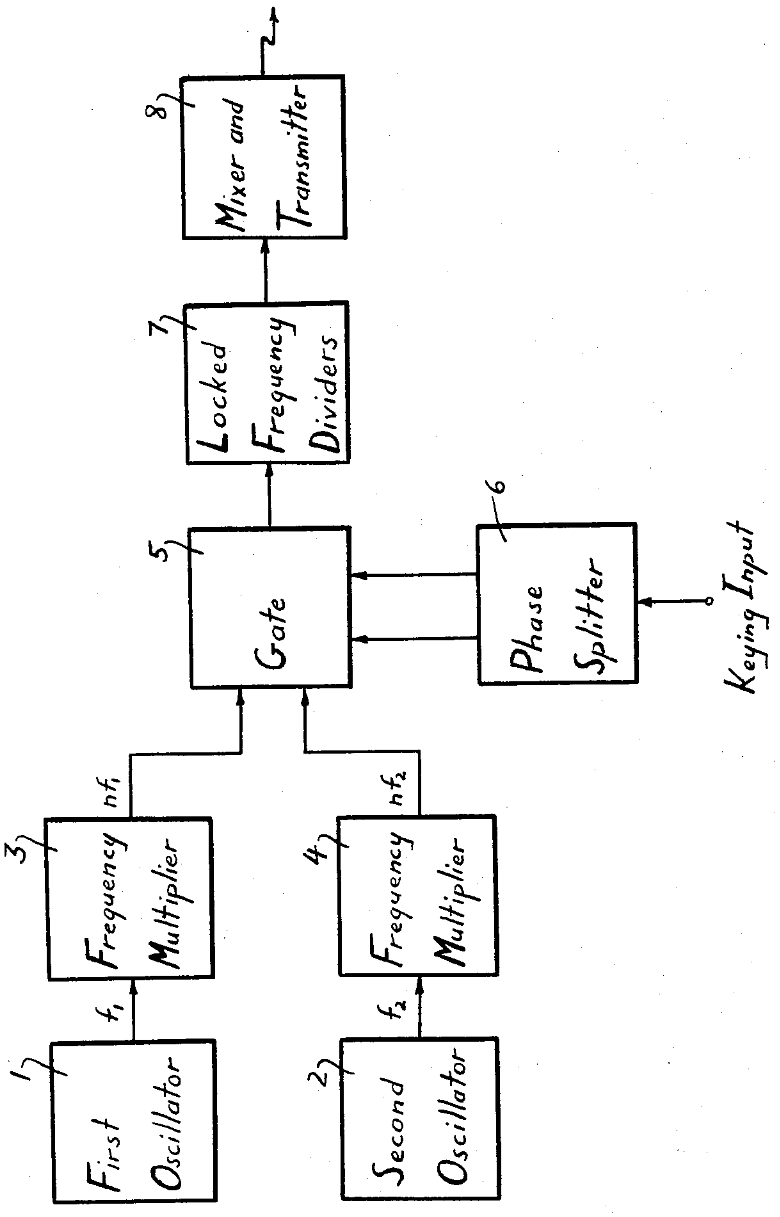
INVENTORS
Martin L. Barton
Jonas M. Shapiro
BY Daniel Jay Tick
Alfred E. Miller
Attorneys United States Patent Office 3,031,527

Patented Apr. 24, 1962

3,031,527
ULTRA STABLE FREQUENCY SHIFT KEYING SYSTEM

Martin L. Barton and Jonas M. Shapiro, Stamford, Conn., assignors to Manson Laboratories, Incorporated, Stamford, Conn., a corporation of Connecticut Filed Sept. 8, 1959, Ser. No. 838,700
15 Claims. (Cl. 178—66)

The present invention relates to an FSK (Frequency Shift Keying) system. More particularly, the present invention relates to an FSK system having considerably improved operating characteristics over known systems of similar type.

Binary FM signals may be simulated by alternate switching of two oscillators, the frequencies of which differ by the required frequency deviation. When the shift in frequency is obtained by switching two RF oscillators, difficulty is experienced due to transients arising from the sudden phase discontinuities caused by the switching, and though filtering may be used the overall result is a system of high inherent distortion. The transients produce instantaneous frequency swings considerably outside the two signal frequencies and thus result in spurious sidebands. Since the phase discontinuity is of a random nature, the transients are also random and will reach their maxima when the two signals are 180 degrees out of phase.

Aside from an undesirable increase in transmitted bandwidth, the transients produce distortion of the demodulated signal at the receiver of the system. The nature of the distortion depends upon the bandwidth of the transmitter and receiver and may be in the form of phase jitter or ringing at the leading and trailing edges of the demodulated FSK signal.

The principal object of the present invention is the provision of an FSK system having new and improved operating characteristics over known systems of similar type.

An object of the present invention is the provision of an FSK system having substantially negligible phase jitter and extremely high frequency stability.

In similar systems of the prior art, the binary signals are gated, or switched, at their initial frequency separation which is relatively small and which produces great signal distortion. We have discovered that the amount of phase jitter of the binary signal varies inversely with the frequency separation prior to switching.

In accordance with the present invention, jitter of the binary signal due to switching transients are minimized by effecting a large initial frequency separation of the two binary signals before switching and subsequently dividing to the required deviation between said signals. The outputs of the two binary signal oscillators are first multiplied upwards to provide a relatively large initial frequency separation and then are gated. The gated signals are divided down to the required deviation by means of locked frequency dividers. The process of frequency division and/or mixing does not increase the amount of phase jitter produced due to alternate switching of two frequencies.

In order that the present invention may be readily carried into effect, it will now be described with reference to the accompanying drawing, wherein the single figure is a schematic block diagram of an embodiment of the FSK system of the present invention.

In order that the operation of the system of the present invention may be readily understood, such system will be described by means of an illustrative example in which typical frequency values are assumed.

In the figure, oscillators 1 and 2 produce the mark frequency and the space frequency, of an FSK system. Each of the oscillators 1 and 2 comprises any suitable stable oscillator of a type known in the art, such as for example, the crystal oscillator described on page 379 of a textbook by F. E. Terman entitled, "Radio Engineering," published by the McGraw-Hill Book Company, Inc. of New York and London, second edition, 1937.

The initial frequency separation between the binary frequencies being relatively small, the oscillator 1 produces a stable frequency of 5.005 megacycles per second, for example, known as $f_1$, and the oscillator 2 produces a stable frequency of 4.995 megacycles per second, for example, known as $f_2$. A frequency in the 5 megacycle region is chosen in the interest of maximum oscillator freqeuncy stability.

The outputs of the oscillators 1 and 2 are supplied to frequency multipliers 3 and 4, respectively. Each of the frequency multipliers 3 and 4 multiplies the frequency supplied to it in a manner and by any suitable means known in the art, such as for example, that described on page 338 of the above identified textbook by F. E. Terman. The frequency multiplier 3 multiplies the frequency $f_1$ twenty times to produce, for example, an output frequency of 100.1 megacycles per second and the frequency multiplier 4 multiplies the frequency $f_2$ twenty times to produce, for example, an output frequency of 99.9 megacycles per second.

The outputs of the frequency multipliers 3 and 4 are supplied to a gate 5 which functions in a manner and by any suitable means known in the art to alternately select one of the input frequencies in accordance with a keying signal supplied thereto. A suitable gate may comprise, for example, that described on page 436 of a textbook by Millman and Taub entitled "Pulse and Digital Circuits," published by the McGraw-Hill Book Company, Inc. of New York, Toronto and London, 1956, wherein each of the input frequencies from the frequency multipliers 3 and 4 is supplied to the control grid of a pentode tube and each of the switching pulses is supplied to the suppressor grid of a pentode.

A keying signal is supplied to a phase splitter 6 which may comprise any suitable phase splitter known in the art, such as, for example, that described on page 18 of the above-identified textbook by Millman and Taub. The keying signal is a substantially square wave which provides the switching control for the system shown by effecting binary, or alternate On-Off, operation. The keying signal is converted by the phase splitter 6 to two switching pulses separated in phase by 180 degrees, in a manner known in the art, to provide push-pull operation of the gate 5. The switching pulses supplied to the gate 5 alternately gate the pentodes of said gate to provide push-pull operation thereof.

The output circuit of the gate 5 includes a tuned circuit wide enough to accept $nf_1$ and $nf_2$ which are the outputs of the frequency multipliers 3 and 4, respectively. The output of the gate 5 is alternately $nf_1$ and $nf_2$ and is supplied to a series or chain of locked frequency dividers 7. Each of the locked frequency dividers comprises any suitable type known in the art, such as, for example, that shown on page 385 of the above-identified textbook by Millman and Taub, wherein a sinusoidal oscillator is synchronized by a harmonic of the output oscillations. The locked frequency dividers 7 reduce the initial frequency separation between $nf_1$ and $nf_2$ to the frequency separation required for the system by a process of regenerative modulation in a manner known in the art. The output circuit of each of the locked frequency dividers 7 includes an oscillator which is alternately phase locked to each of the frequencies $f_1$ and $f_2$ to produce binary FM signals with the desired frequency separation.

The output signals produced by the system of the present invention are suitable for mixing and transmission as highly stable FSK signals with greatly reduced distortion (minimum phase jitter). Said output signals may thus be mixed and transmitted by suitable mixing and transmitting means 8.

Experimental results indicate that the amount of phase jitter in the system is inversely proportional to the frequency separation between $nf_1$ and $nf_2$ prior to switching. For example, if the frequency separation is 200 kilocycles, the system will have $\frac{1}{200}$ kilocycles or 5 microseconds of jitter irrespective of any subsequent division by locked frequency dividers. A high speed data transmission system of the type of the present invention results in only about 5 percent of phase jitter at a signalling speed of 5 kilocycles per second (or 10,000 bits per second) and a frequency stability better than one in $10^8$.

While the invention has been described by means of a specific example and in a specific embodiment, we do not wish to be limited thereto, for obvious modifications will occur to those skilled in the art without departing from the spirt and scope of the invention.

What we claim is:

1. In a frequency shift keying system, in combination, signal means for producing binary signals having an initial frequency separation; switching means adapted to alternately switch binary signals; prior means for increasing prior to switching by said switching means the initial frequency separation between the binary signals produced by said signal means to produce binary signals having an intermediate frequency separation greater than said initial frequency separation; and subsequent means for decreasing subsequent to switching by said switching means the intermediate frequency separation between the binary signals produced by said prior means to produce binary signals having a desired subsequent frequency separation.

2. In a frequency shift keying system, in combination, signal means for producing binary signals having an initial frequency separation; switching means adapted to alternately switch binary signals, said switching means having an input and an output; prior means connected between said signal means and the input of said switching means for increasing prior to switching by said switching means the initial frequency separation between the binary signals produced by said signal means to produce binary signals having an intermediate frequency separation greater than said initial frequency separation; and subsequent means connected to the output of said switching means for decreasing subsequent to switching by said switching means the intermediate frequency separation between the binary signals produced by said prior means to produce binary signals having a desired subsequent frequency separation.

3. In a frequency shift keying system, in combination, signal means for producing binary signals having an initial frequency separation; prior means connected to said signal means for increasing the initial frequency separation between the binary signals produced by said signal means to produce binary signals having an intermediate frequency separation greater than said initial frequency separation; switching means adapted to alternately switch binary signals; prior coupling means for supplying the binary signals produced by said prior means to said switching means; subsequent means for decreasing the intermediate frequency separation between the binary signals produced by said prior means to produce binary signals having a desired subsequent frequency separation; and subsequent coupling means for supplying the binary signals switched by said switching means to said subsequent means.

4. In a frequency shift keying system, in combination, signal means for producing binary signals having an initial freqency separation; switching means adapted to alternately switch binary signals; frequency multiplying means for frequency multiplying prior to switching by said switching means the binary signals produced by said signal means thereby increasing the initial frequency separation between the binary signals produced by said signal means to produce binary signals having an intermediate frequency separation greater than said initial frequency separation; and subsequent means for decreasing subsequent to switching by said switching means the intermediate frequency separation between the binary signals produced by said frequency multiplying means to produce binary signals having a desired subsequent frequency separation.

5. In a frequency shift keying system, in combination, signal means for producing binary signals having an initial frequency separation; switching means adapted to alternately switch binary signals; prior means for increasing prior to switching by said switching means the initial frequency separation between the binary signals produced by said signal means to produce binary signals having an intermediate frequency separation greater than said initial frequency separation; and frequency dividing means for frequency dividing subsequent to switching by said switching means the binary signals produced by said prior means thereby decreasing the intermediate frequency separation between the binary signals produced by said prior means to produce binary signals having a desired subsequent frequency separation.

6. In a frequency shift keying system, in combination, signal means for producing binary signals having an initial frequency separation; switching means adapted to alterately switch binary signals; frequency multiplying means for frequency multiplying prior to switching by said switching means the binary signals produced by said signal means thereby increasing the initial frequency separation between the binary signals produced by said signal means to produce binary signals having an intermediate frequency separation greater than said initial frequency separation; and frequency dividing means for frequency dividing subsequent to switching by said switching means the binary signals produced by said frequency multiplying means thereby decreasing the intermediate frequency separation between the binary signals produced by said frequency multiplying means to produce binary signals having a desired subsequent frequency separation.

7. In a frequency shift keying system, in combination, signal means for producing binary signals having an initial frequency separation; frequency multiplying means connected to said signal means for frequency multiplying the binary signals produced by said signal means thereby increasing the initial frequency separation between the binary signals produced by said signal means to produce binary signals having an intermediate frequency separation greater than said initial frequency separation; switching means adapted to alternately switch binary signals; prior coupling means for supplying the binary signals produced by said frequency multiplying means to said switching means; subsequent means for decreasing the intermediate frequency separation between the binary signals produced by said frequency multiplying means to produce binary signals having a desired subsequent frequency separation; and subsequent coupling means for suppling the binary signals switched by said switching means to said subsequent means.

8. In a frequency shift keying system, in combination, signal means for producing binary signals having an initial frequency separation; prior means connected to said signal means for increasing the initial frequency separation between the binary signals produced by said signal means to produce binary signals having an intermediate frequency separation greater than said initial frequency separation; switching means adapted to alternately switch binary signals; prior coupling means for supplying the binary signals produced by said prior means to said switching means; frequency dividing means for frequency dividing the binary signals produced by said prior means thereby decreasing the intermediate frequency separation between the binary signals produced by said prior means to produce binary signals having a desired subsequent frequency separation; and subsequent coupling means for supplying the binary signals switched by said switching means to said frequency dividing means.

9. In a frequency shift keying system, in combination, signal means for producing binary signals having an initial frequency separation; frequency multiplying means connected to said signal means for frequency multiplying the binary signals produced by said signal means thereby increasing the initial frequency separation between the binary signals produced by said signal means to produce binary signals having an intermediate frequency separation greater than said initial frequency separation; switching means adapted to alternately switch binary signals; prior coupling means for supplying the binary signals produced by said frequency multiplying means to said switching means; frequency dividing means for frequency dividing the binary signals produced by said frequency multiplying means thereby decreasing the intermediate frequency separation between the binary signals produced by said frequency multiplying means to produce binary signals having a desired subsequent frequency separation; and subsequent coupling means for supplying the binary signals switched by said switching means to said frequency dividing means.

10. In a frequency shift keying system, in combination, signal means for producing binary signals having an initial frequency separation; switching means; switching control means for alternately switching said switching means to alternately gate binary signals; prior means for increasing prior to switching by said switching means the initial frequency separation between the binary signals produced by said signal means to produce binary signals having an intermediate frequency separation greater than said initial frequency separation; and subsequent means for decreasing subsequent to switching by said switching means the intermediate frequency separation between the binary signals produced by said prior means to produce binary signals having a desired subsequent frequency separation.

11. In a frequency shift keying system, in combination, signal means for producing binary signals having an initial frequency separation; prior means connected to said signal means for increasing the initial frequency separation between the binary signals produced by said signal means to produce binary signals having an intermediate frequency separation greater than said initial frequency separation; switching means; switching control means for alternately switching said switching means to alternately gate binary signals; prior coupling means for supplying the binary signals produced by said prior means to said switching means; subsequent means for decreasing the intermediate frequency separation between the binary signals produced by said prior means to produce binary signals having a desired subsequent frequency separation; and subsequent coupling means for supplying the binary signals switched by said switching means to said subsequent means.

12. In a frequency shift keying system, in combination, signal means for producing binary signals having an initial frequency separation; prior means connected to said signal means for increasing the initial frequency separation between the binary signals produced by said signal means to produce binary signals having an intermediate frequency separation greater than said initial frequency separation; switching means; switching control means for alternately switching said switching means to alternately gate binary signals, said switching control means comprising means for providing a keying signal, phase inverting means for converting said keying signal to switching signals in phase opposition to each other and coupling means for supplying said switching signals to said switching means in a manner whereby said switching means is alternately switched to alternately gate binary signals; prior coupling means for supplying the binary signals produced by said prior means to said switching means; subsequent means for decreasing the intermediate frequency separation between the binary signals produced by said prior means to produce binary signals having a desired subsequent frequency separation; and subsequent coupling means for supplying the binary signals switched by said switching means to said subsequent means.

13. In a frequency shift keying system, in combination; first signal means for producing a first signal having a first frequency second signal means for producing a second signal having a second frequency, said first and second frequencies being different from each other so that said first and second signals have an initial frequency separation between them; switching means adapted to alternately switch binary signals; first frequency multiplying means for frequency multiplying said first signal *n* times prior to switching by said switching means; second frequency multiplying means for frequency multiplying said second signal *n* times prior to switching by said switching means thereby increasing the initial frequency separation between said first and second signals to produce binary signals having an intermediate frequency separation greater than said initial frequency separation; and subsequent means for decreasing subsequent to switching by said switching means the intermediate frequency separation between the binary signals produced by said prior means to produce binary signals having a desired subsequent frequency separation.

14. In a frequency shift keying system, in combination, first signal means for producing a first signal having a first frequency; second signal means for producing a second signal having a second frequency, said first and second frequencies being different from each other so that said first and second signals have an initial frequency separation between them; switching means adapted to alternately switch binary signals; first frequency multiplying means for frequency multiplying said first signal *n* times prior to switching by said switching means; second frequency multiplying means for frequency multiplying said second signal *n* times prior to switching by said switching means thereby increasing the initial frequency separation between said first and second signals to produce binary signals having an intermediate frequency separation greater than said initial frequency separation; and locked frequency dividing means for frequency dividing subsequent to switching by said switching means the binary signals produced by said first and second frequency multiplying means thereby decreasing the intermediate frequency separation between the binary signals produced by said first and second frequency multiplying means to produce binary signals having a desired subsequent frequency separation.

15. In a frequency shift keying system, in combination; first signal means for producing a first signal having a first frequency; second signal means for producing a second signal having a second frequency, said first and second frequencies being different from each other so that said first and second signals have an initial frequency separation between them; switching means adapted to alternately switch binary signals; first frequency multiplying means connected to said first signal means for frequency multiplying said first signal *n* times; first prior coupling means for supplying the signal produced by said first signal means to said switching means; second frequency multiplying means connected to said second signal means for frequency multiplying said second signal *n* times thereby increasing the initial frequency separation between said first and second signals to produce binary signals having an intermediate frequency separation greater than said initial frequency seperation; second prior coupling means for supplying the signal produced by said second signal means to said switching means; locked frequency dividing means for frequency dividing the binary signals produced by said first and second frequency multiplying means thereby decreasing the intermediate frequency separation between the binary signals produced by said first and second frequency multiplying means to produce binary signals having a desired subsequent frequency separation; and subsequent coupling means for supplying the binary signals switched by said switching means to said locked frequency dividing means.

References Cited in the file of this patent

UNITED STATES PATENTS

| | | |
|---|---|---|
| 1,998,792 | Sedmayer | Apr. 23, 1935 |
| 2,459,462 | Shenk | Jan. 18, 1949 |
| 2,482,561 | Shenk | Sept. 20, 1949 |
| 2,676,203 | Phelps | Apr. 20, 1954 |